United States Patent
Oshinsky et al.

(10) Patent No.: US 10,534,709 B2
(45) Date of Patent: Jan. 14, 2020

(54) FLUSH COMMAND CONSOLIDATION (71) Applicant: SanDisk Technologies LLC, Plano, TX (US)

(72) Inventors: Hadas Oshinsky, Kfar Saba (IL); Rotem Sela, Haifa (IL); Amir Shaharabany, Kochav Yair (IL)

(73) Assignee: SanDisk Technologies LLC, Addison, TX (US)

( * ) Notice: Subject to any disclaimer, the term of this patent is extended or adjusted under 35 U.S.C. 154(b) by 425 days.

(21) Appl. No.: 15/252,251

(22) Filed: Aug. 31, 2016

(65) Prior Publication Data

US 2018/0060232 A1 Mar. 1, 2018

(51) Int. Cl.
*G06F 12/0804* (2016.01)
*G06F 12/0868* (2016.01)

(52) U.S. Cl.
CPC ...... *G06F 12/0804* (2013.01); *G06F 12/0868* (2013.01); *G06F 2212/1032* (2013.01)

(58) Field of Classification Search
CPC ..... G06F 3/0655; G06F 3/0656; G06F 3/0659
See application file for complete search history.

(56) References Cited

U.S. PATENT DOCUMENTS

| | | | | |
|---|---|---|---|---|
| 9,632,711 | B1* | 4/2017 | Obr | G06F 3/0619 |
| 2008/0005465 | A1* | 1/2008 | Matthews | G06F 3/0619 |
| | | | | 711/113 |
| 2011/0252201 | A1* | 10/2011 | Koren | G06F 11/1448 |
| | | | | 711/135 |
| 2014/0006543 | A1* | 1/2014 | Pitts | G06F 15/167 |
| | | | | 709/213 |
| 2015/0134857 | A1* | 5/2015 | Hahn | G06F 3/061 |
| | | | | 710/5 |
| 2015/0220439 | A1* | 8/2015 | Mickens | G06F 3/061 |
| | | | | 711/135 |
| 2016/0034188 | A1* | 2/2016 | Bisht | G06F 3/061 |
| | | | | 710/53 |

\* cited by examiner

*Primary Examiner* — Edward J Dudek, Jr.
*Assistant Examiner* — Andrew Russell
(74) *Attorney, Agent, or Firm* — Vierra Magen Marcus LLP (57) ABSTRACT

A data storage device includes a write cache, a non-volatile memory and a controller coupled to the write cache and to the non-volatile memory. The controller is configured to, responsive to receiving a plurality of flush commands, write all data from the write cache to the non-volatile memory while executing fewer than all of the plurality of flush commands.

12 Claims, 6 Drawing Sheets

FLUSH COMMAND CONSOLIDATION

BACKGROUND

Semiconductor memory is widely used in various electronic devices such as mobile computing devices, mobile phones, solid-state drives, digital cameras, personal digital assistants, medical electronics, servers, and non-mobile computing devices. Semiconductor memory may include non-volatile memory or volatile memory. A non-volatile memory device allows information to be stored or retained even when the non-volatile memory device is not connected to a power source. In contrast, the content of volatile memory, such as volatile cache, are erased when the volatile memory device is disconnected from a power source. For simplicity, "volatile cache" will be referred to as "cache."

Data storage devices may include a memory controller and one or more semiconductor memory devices. Date storage devices may be configured to write data to multiple memory cells concurrently, rather than writing data to one memory cell at a time. In such data storage devices, the smallest set of memory cells that can be written at a time may be referred to as a write block. Because individual write commands may be associated with less than a full write block of data, a data storage device may store data to be written to a non-volatile memory in a cache. After sufficient data are available in the cache to fill a write block, a full write block of data may be written from the cache to the non-volatile memory.

In certain circumstances, a device (e.g., a host) coupled to the data storage device may issue a flush command to clear the cache. In response to receiving the flush command, the data storage device writes the data in the cache to the non-volatile memory. However, flush commands are costly, and may decrease system throughput.

DETAILED DESCRIPTION

Technology is described to reduce a number of flush commands executed by a data storage device. In embodiments, multiple flush commands are received or retrieved by a data storage device, instructing the data storage device to write data in cache to non-volatile memory. In an embodiment, the data storage device writes the data in cache to non-volatile memory but executes fewer than all of the flush commands.

Figure 1:
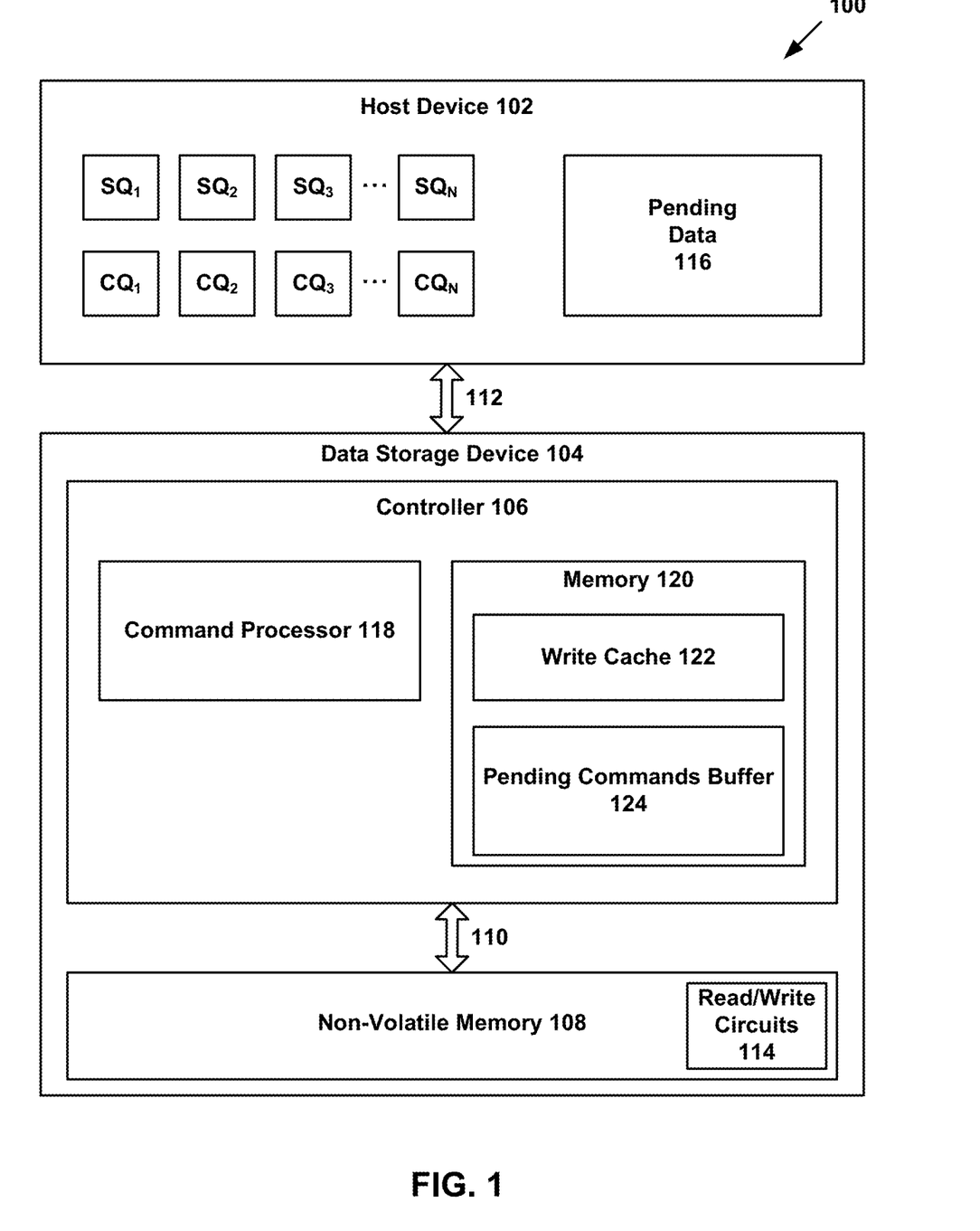
FIG. 1 is a block diagram of an embodiment of a system including a host device and a data storage device.

FIG. 1 is a block diagram of an embodiment of a system 100 that includes a host device 102 and a data storage device 104. Host device 102 may be a mobile telephone, a music player, a video player, a gaming console, an electronic book reader, a personal digital assistant (PDA), a computer, such as a laptop computer, notebook computer, or tablet, any other electronic device, or any combination thereof.

Data storage device 104 includes a controller 106 and a non-volatile memory 108. Controller 106 and non-volatile memory 108 may be on separate die or on a common die. In an embodiment, non-volatile memory 108 includes one or more memory die (not shown) that are coupled to controller 106 via a first communication channel 110 (e.g., a data bus). In an embodiment, host device 102 is coupled to data storage device 104 via a second communication channel 112 (e.g., a bus, a network, or a combination of networks).

Non-volatile memory 108 may use memory cells that include one or more memory technologies, such as, a Flash memory (e.g., NAND, NOR, Multi-Level Cell (MLC), Divided bit-line NOR (DINOR), AND, high capacitive coupling ratio (HiCR), asymmetrical contactless transistor (ACT), or other Flash memory technologies), a Resistive Random Access Memory (RRAM or ReRAM), or any other type of memory technologies. The memory cells of non-volatile memory 108 may be configured according to various architectures, such as a byte modifiable architecture or a non-byte modifiable architecture (e.g., a page modifiable architecture).

Non-volatile memory 108 may have a three-dimensional (3D) memory configuration, such as a vertical bit line (VBL) 3D architecture. For example, non-volatile memory 108 may include a 3D VBL ReRAM. In an embodiment, non-volatile memory 108 has a 3D memory configuration that is monolithically formed in one or more physical levels of arrays of memory cells having an active area disposed above a silicon substrate. Alternatively, non-volatile memory 108 may have another configuration, such as a two-dimensional (2D) memory configuration or a stacked 2D memory configuration.

In an embodiment, non-volatile memory 108 includes memory cells, each of which may be configured to operate as a single bit cell (SBC) or as a multibit cell (MBC). Non-volatile memory 108 also may include support circuitry, such as read/write circuits 114, to support operation of one or more memory dies of the non-volatile memory. Read/write circuits 114 may be a single component or separate components, such as read circuitry and write circuitry. Read/write circuits 114 may be external to one or more memory die of non-volatile memory 108. Alternatively, one or more individual memory die may include corresponding read/write circuitry that reads from and/or writes to memory cells within the individual memory die independent of any other read and/or write operations at any of the other memory die.

Host device 102 and data storage device 104 communicate via second communication channel 112. In an embodiment, host device 102 provides data to data storage device 104 for storage in non-volatile memory 108, and requests data to be read from non-volatile memory 108. In an embodiment, host device 102 communicates with data storage device 104 via a memory interface that enables reading from data storage device 104 and writing to data storage device 104.

In an embodiment, host device 102 operates in compliance with Non-Volatile Memory express (NVMe) specification, a Small Computer System Interface (SCSI) specification. In another embodiment, host device 102 operates in compliance with a Joint Electron Devices Engineering Council (JEDEC) industry specification, such as an embedded MultiMedia Card (eMMC) specification. As other examples, host device 102 may operate in compliance with a Universal Flash Storage (UFS) Host Controller Interface specification, a Universal Serial Bus (USB) specification, or a Secure Digital (SD) Host Controller specification, as illustrative examples.

Alternatively, host device 102 may communicate with data storage device 104 via a network using a network protocol, such as a Network File System (NFS) protocol, a Common Internet File System (CIFS) protocol, a Hypertext Transfer Protocol (HTTP), a Hypertext Transfer Protocol Secure (HTTPS), a File Transfer Protocol (FTP), a Secure File Transfer Protocol (SFTP), a Point to Point Protocol (PPP), an Internet Protocol (IP), a Transmission Control Protocol (TCP), another communication protocol, or a combination thereof.

In an embodiment, data storage device 104 is coupled to host device 102 and configured as embedded memory. In another embodiment, data storage device 104 is a removable device that is removably coupled to host device 102. For example, data storage device 104 may be a memory card. Data storage device 104 may operate in compliance with a JEDEC industry specification, one or more other specifications, or a combination thereof. For example, data storage device 104 may operate in compliance with a USB specification, a UFS specification, an SD specification, or a combination thereof.

In yet another embodiment, data storage device 104 is coupled to host device 102 indirectly, e.g., via one or more networks. For example, data storage device 104 may be a network-attached storage (NAS) device or a component (e.g., a solid-state drive (SSD) device) of a data center storage system, and Enterprise storage system or a storage area network.

In an embodiment, host device 102 generates commands (e.g., read commands, write commands, flush commands, or other commands) for data storage device 104. In an embodiment, host device 102 stores the generated commands as pending commands in one or more submission queues $SQ_1$, $SQ_2$, . . . , $SQ_N$. As used herein, a pending command is a command that has been submitted by host device 102 and that has not been indicated by data storage device 104 as complete. In an embodiment, each write command has associated pending data 116 to be written to non-volatile memory 108 of the data storage device 104.

In an embodiment, host device 102 may include one or more processors (not shown) that include multiple processor cores. A first processor core may generate commands for data storage device 104 that are stored as pending commands in submission queue $SQ_1$, a second processor core may generate commands for data storage device 104 that are stored as pending commands in submission queue $SQ_2$, and so on. In other embodiments, each processor core may generate commands for data storage device 104 that are stored as pending commands in any of submission queues $SQ_1$, $SQ_2$, . . . , $SQ_N$.

In an embodiment, one or more of the processors of host device 102 may execute multiple software threads. A first software thread may generate commands for data storage device 104 that are stored as pending commands in submission queue $SQ_1$, a second software thread may generate commands for data storage device 104 that are stored as pending commands in submission queue $SQ_2$, and so on. In other embodiments, each software thread may generate commands that are stored as pending commands in any of submission queues $SQ_1$, $SQ_2$, . . . , $SQ_N$.

In an embodiment, controller 106 includes a command processor 118 and a memory 120. As described in more detail below, in an embodiment command processor 118 receives or retrieves pending commands from submission queues $SQ_1$, $SQ_2$, . . . , $SQ_N$ of host device 102, and stores the retrieved pending commands in memory 120. In an embodiment, command processor 118 selects pending commands from memory 120 in an order determined by command processor 118 and executes the selected pending commands. After executing a pending command, command processor 118 sends host device 102 a "completed indication" to indicate that the pending command is complete.

In an embodiment, host device 102 includes one or more completion queues $CQ_1$, $CQ_2$, . . . , $CQ_N$ that may be used to indicate completion status associated with pending commands stored in corresponding submission queues $SQ_1$, $SQ_2$, . . . , $SQ_N$. In an embodiment, when host device 102 receives a completed indication from command processor 118 for a pending command (e.g., a first pending command) stored in one of submission queues $SQ_1$, $SQ_2$, . . . , $SQ_N$ (e.g., $SQ_3$), host device 102 updates the corresponding completion queue $CQ_1$, $CQ_2$, . . . , $CQ_N$ (e.g., $CQ_3$) to indicate that the first pending command has an associated status of "complete."

Figure 2:
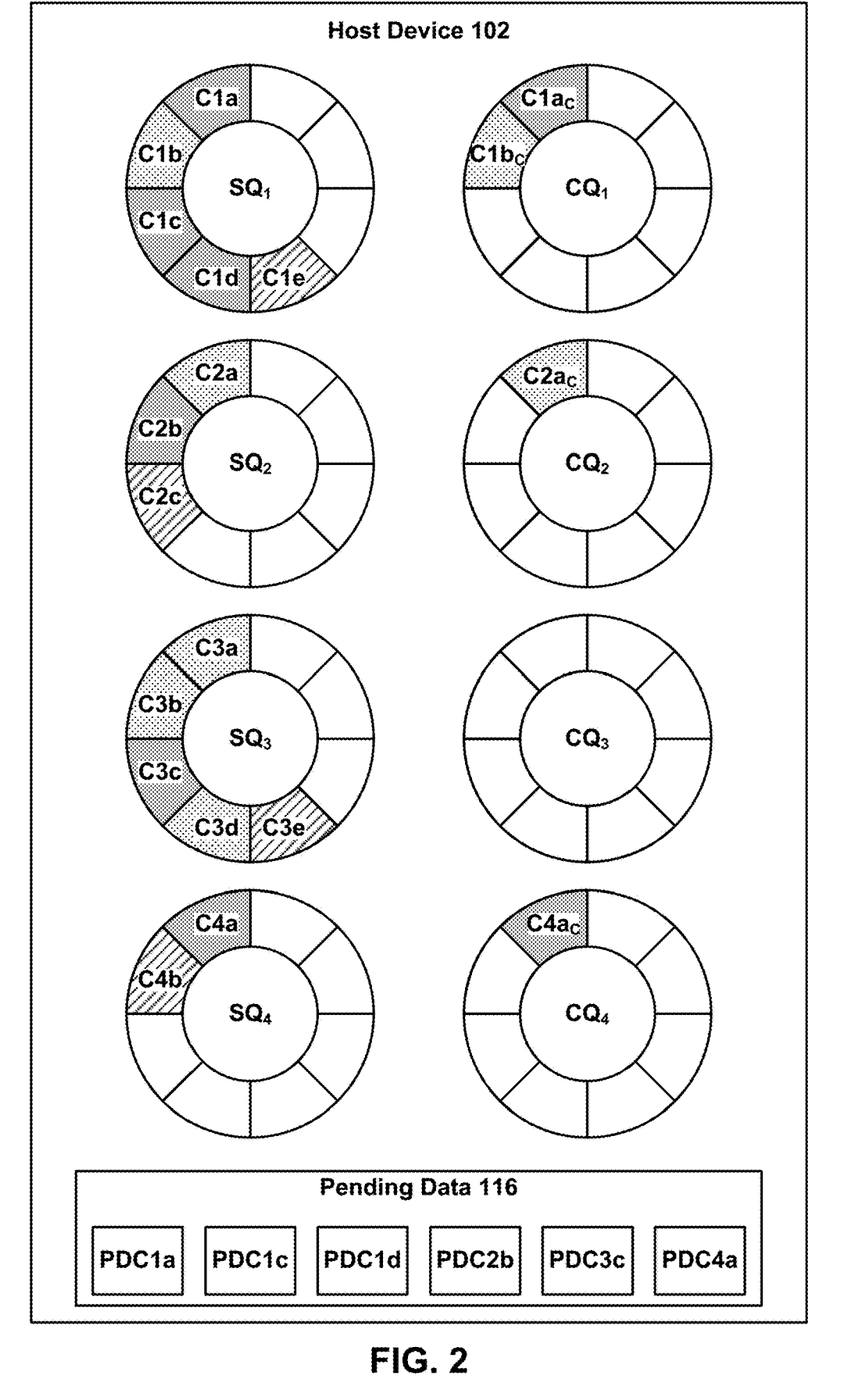
FIG. 2 is a block diagram of an embodiment of a host device of FIG. 1.

FIG. 2 illustrates an example host device 102 that has submission queues $SQ_1$, $SQ_2$, $SQ_3$, $SQ_4$ and completion queues $CQ_1$, $CQ_2$, $CQ_3$, $CQ_4$. In an embodiment, each of submission queues $SQ_1$, $SQ_2$, $SQ_3$ and $SQ_4$ is a circular buffer that may be used to store one or more pending commands, and each of completion queues $CQ_1$, $CQ_2$, $CQ_3$ and $CQ_4$ is a circular buffer that may be used to indicate completion status associated with pending commands stored in corresponding submission queues $SQ_1$, $SQ_2$, $SQ_3$ and $SQ_4$. Other types of queues may be used for submission queues $SQ_1$, $SQ_2$, $SQ_3$, $SQ_4$ and completion queues $CQ_1$, $CQ_2$, $CQ_3$, $CQ_4$.

In the illustrated example, submission queue $SQ_1$ includes pending commands C1a, C1b, C1c, C1d and C1e, submission queue $SQ_2$ includes pending commands C2a, C2b and C2c, submission queue $SQ_3$ includes pending commands C3a, C3b, C3c, C3d and C3e, and submission queue $SQ_4$ includes pending commands C4a and C4b. In addition, completion queue $CQ_1$ includes completed indications $C1a_C$ and $C1b_C$ (indicating that pending commands C1a and C1b, respectively, of submission queue $SQ_1$ have an associated status of complete), completion queue $CQ_2$ includes completed indication $C2a_C$ (indicating that pending command C2a of submission queue $SQ_2$ has an associated status of complete), completion queue $CQ_3$ includes no completed indications, and completion queue $CQ_4$ includes completed indication $C4a_C$ (indicating that pending command C4a of submission queue $SQ_4$ has an associated status of complete).

In an embodiment, commands C1a, C1c, C1d, C2b, C3c and C4a are write commands, C1b, C2a, C3a and C3b are read commands, and C1e, C2c C3e and C4b are flush commands. Other commands may be used. Pending data 116 includes data PDC1a, PDC1c, PDC1d, PDC2b, PDC3c and PDC4a associated with write commands C1a, C1c, C1d, C2b, C3c and C4a, respectively.

Referring again to FIG. 1, in an embodiment, memory 120 includes volatile memory that may be used to stage (e.g., store) data and/or commands for processing by controller 106. In an embodiment, memory 120 includes a write cache 122. When command processor 118 receives/retrieves pending data 116 from host device 102 to be written to non-volatile memory 108, command processor 118 may stage the data at write cache 122.

For example, command processor 118 may use write cache 122 to aggregate data to fill write blocks before the full write blocks are written to non-volatile memory 108. Thus, the data in write cache 122 may include one or more partial write blocks. After data added to write cache 122 are aggregated to fill a write block, controller 106 writes the full write block to non-volatile memory 108.

In an embodiment, memory 120 includes a pending commands buffer 124. In an embodiment, command processor 118 obtains (e.g., receives or retrieves) pending commands from submission queues $SQ_1, SQ_2, \ldots, SQ_N$ of host device 102, and stores the received/retrieved pending commands in pending commands buffer 124. In an embodiment, command processor 118 selects pending commands from pending commands buffer 124 in an order determined by command processor 118 and executes the selected pending commands. After executing a pending command, command processor 118 sends host device 102 a completed indication to indicate that the pending command is complete. In an embodiment, command processor 118 may interact with host device 102 according to a Non-Volatile Memory Express (NVMe) protocol to receive/retrieve pending commands from submission queues $SQ_1, SQ_2, \ldots, SQ_N$ of host device 102.

As described above, each write command (e.g., pending write commands C1$a$, C1$c$, C1$d$, C2$b$, C3$c$ and C4$a$ of FIG. 2) has associated data (e.g., pending data PDC1$a$, PDC1$c$, PDC1$d$, PDC2$b$, PDC3$c$ and PDC4$a$ of FIG. 2) that are to be written to non-volatile memory 108 of the data storage device 104. In an embodiment, when command processor 118 executes a pending write command, command processor 118 obtains pending data 116 associated with the pending write command from host device 102, and either writes the associated pending data to non-volatile memory 108 (e.g., if pending data 116 fill a write block) or writes the associated pending data to write cache 122 (e.g., if pending data 116 are added to or used to form a partial write block).

In an embodiment, when command processor 118 obtains pending data 116 associated with a particular write command, whether pending data 116 are written to non-volatile memory 108 or are written to write cache 122, command processor 118 sends host device 102 a completed indication to indicate that the pending write command is complete.

In an embodiment, when host device 102 receives the completed indication associated with the particular write command, host device 102 updates the corresponding completion queue $CQ_1, CQ_2, \ldots, CQ_N$ (e.g., $CQ_3$) to indicate that the particular write command has an associated status of "complete." The received completed indication indicates to host device 102 that data storage device 104 has received pending data 116 associated with the particular write command. The completed indication does not indicate to host device 102 that pending data 116 associated with the particular write command have been written to non-volatile memory 108.

To illustrate, when command processor 118 executes a write command, command processor 118 may provide a completed indication to host device 102 while data associated with the write command are staged at write cache 122, before the data are written to non-volatile memory 108. Additionally, after obtaining pending data 116 associated with the particular write command, command processor 118 may remove the particular write command from pending commands buffer 124.

In an embodiment, write cache 122 is maintained in volatile memory. Thus, a power loss may result in loss of data in write cache 122. Because data in write cache 126 are associated with commands indicated as complete, to keep an accurate record of data written to non-volatile memory 108 (not just to write cache 122), host device 102 may occasionally issue a flush command. A flush command instructs command processor 118 to write all data that are stored in write cache 122 to non-volatile memory 108.

In an embodiment, after command processor 118 writes data in write cache 122 to non-volatile memory 108, command processor 118 sends host device 102 a "committed indication" to indicate that the pending flush command is complete. In an embodiment, a committed indication indicates to host device 102 that all data associated with write commands previously indicated as completed in completion queues $CQ_1, CQ_2, \ldots, CQ_N$ have been written to non-volatile memory 108.

In an embodiment, a committed indication corresponds to one or more completed indications associated with a flush command. To illustrate, in the NVMe specification, flush commands and write commands each follow the same process flow. Thus, host device 102 may submit a flush command to one of submission queues $SQ_1, SQ_2, \ldots, SQ_N$, and controller 106 may retrieve the flush command and store the flush command in pending commands buffer 124. In an embodiment, when command processor 118 executes the flush command (e.g., when all data in write cache 122 have been written to non-volatile memory 108), command processor 118 sends a completed indication to host device 102 to indicate that the flush command is complete. Host device 102 updates the corresponding completion queue $CQ_1, CQ_2, \ldots, CQ_N$ to indicate that the flush command has completed.

In many data storage systems, a flush operation is "costly." For example, when executing a flush command a data storage device typically must wait until all of the data in write cache are written to non-volatile memory. Waiting for the data to be written to non-volatile memory has a high latency. In addition, the throughput of data storage device may drop because waiting for the data to be written to the non-volatile memory may require working in a non-optimal pipeline, which may cause a drop in system throughput to the non-volatile memory. Technology is described for reducing a number of flush commands executed by a data storage device. Without wanting to be bound by any particular theory, it is believed that reducing a number of flush commands executed by the data storage device may increase system throughput.

In an embodiment, a data storage device is configured to reduce a number of flush commands executed by the data storage device. In an embodiment, controller 106 of data storage device 104 of FIG. 1 is configured to reduce a number of flush commands executed by data storage device 104. In an embodiment, command processor 118 of FIG. 1 is configured to reduce a number of flush commands executed by data storage device 104.

As described above, in an embodiment, command processor 118 selects pending commands from pending commands buffer 124 in an order determined by command processor 118 and executes the selected pending commands. In an embodiment, when command processor 118 selects a flush command from pending commands buffer 124, command processor 118 scans pending commands buffer 124 to determine if pending commands buffer 124 includes additional flush commands.

In an embodiment, if command processor 118 determines that pending commands buffer 124 includes additional flush commands, command processor 118 consolidates execution of one or more of the flush commands in pending commands buffer 124. In an embodiment, command processor 118 consolidates execution of all of the flush commands in pending commands buffer 124. In other embodiments, command processor 118 consolidates execution of fewer than all of the flush commands in pending commands buffer 124. If command processor 118 determines that pending commands buffer 124 does not include additional flush commands, command processor executes the selected flush command.

Figure 3:
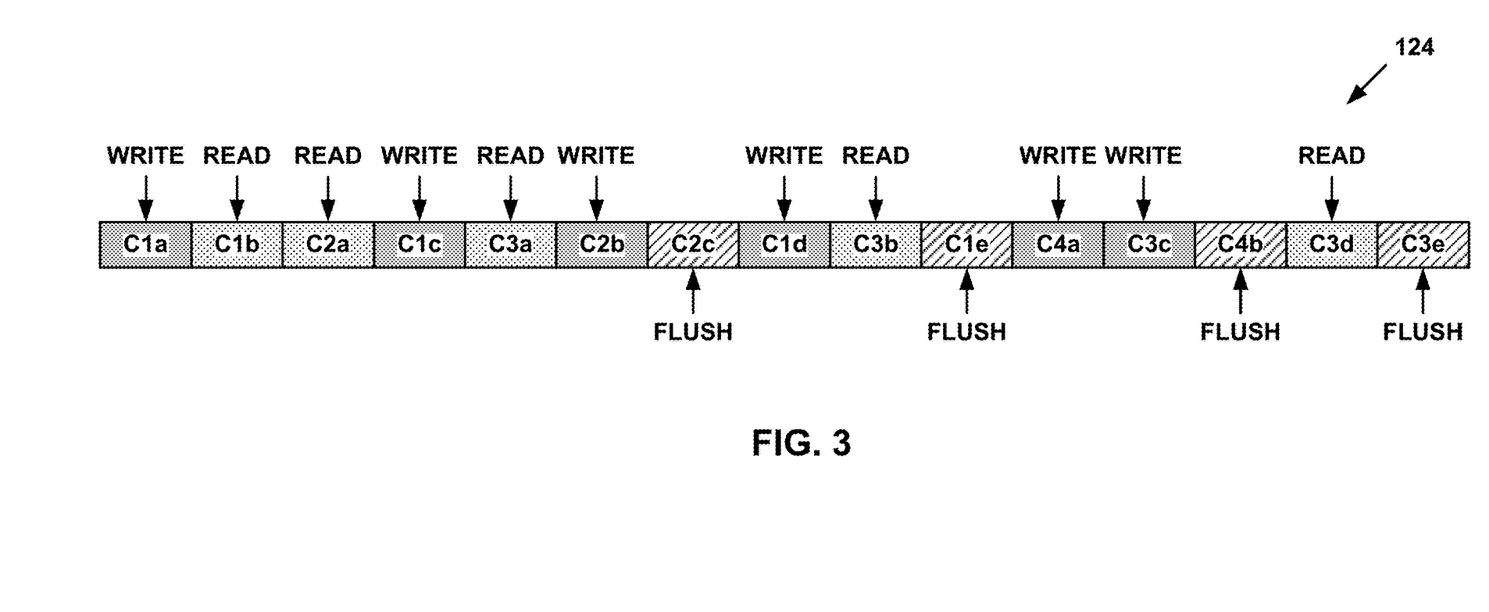
FIG. 3 is a diagram of an embodiment of a pending commands buffer of the data storage device of FIG. 1.

FIG. 3 is a diagram illustrating an example pending commands buffer 124 that includes pending commands from example submission queues $SQ_1$, $SQ_2$, $SQ_3$, $SQ_4$ of FIG. 2. In this example, command processor 118 retrieved fourteen pending commands from submission queues $SQ_1$, $SQ_2$, $SQ_3$, $SQ_4$ and stored the retrieved pending commands in pending commands buffer 124. In particular, pending commands buffer 124 includes pending write command C1a from submission queue $SQ_1$, pending read command C1b from submission queue $SQ_1$, pending read command C2a from submission queue $SQ_2$, pending write command C1c from submission queue $SQ_1$, pending read command C3a from submission queue $SQ_3$, pending write command C2b from submission queue $SQ_2$, pending flush command C2c from submission queue $SQ_2$, pending write command C1d from submission queue $SQ_1$, pending read command C3b from submission queue $SQ_3$, pending flush command C1e from submission queue $SQ_1$, pending write command C4a from submission queue $SQ_4$, pending write command C3c from submission queue $SQ_3$, pending flush command C4b from submission queue $SQ_4$, pending read command C3d from submission queue $SQ_3$, and pending flush command C3e from submission queue $SQ_3$.

In an embodiment, command processor 118 selects pending commands in pending commands buffer 124 and executes each selected command in sequential order in which the pending commands are stored in pending commands buffer 124. That is, command processor 118 first selects and executes pending write command C1a, then selects and executes pending read command C1b, and so on. In other embodiments, command processor 118 may select pending commands in pending commands buffer 124 in other than sequential order. For example, command processor 118 may select pending commands from pending commands buffer 124 based on a priority associated with each pending command.

After selecting and executing pending write command C2b, command processor 118 selects pending command C2c. Pending command is the first flush command in pending commands buffer 124, and is referred to herein as a "first flush command." Because command C2c is a first flush command selected by command processor 118, command processor 118 scans pending commands buffer 124 to determine if pending commands buffer 124 includes additional flush commands.

In the example pending commands buffer 124 depicted in FIG. 3, command processor 118 scans pending commands buffer 124 and determines that pending commands buffer 124 includes three additional flush commands: C1e, C4b and C3e. Command C3e is the last flush command in pending commands buffer 124, and is referred to herein as a "last flush command." Commands C1e and C4b are neither first flush commands or last flush commands, and are referred to herein as "intermediate flush commands."

In an embodiment, command processor 118 consolidates execution of one or more of flush commands C2c, C1e, C4b and C3e. In an embodiment, command processor 118 consolidates execution of all of flush commands C2c, C1e, C4b and C3e into execution of flush command C3e. In an embodiment, command processor 118 bypasses execution of the first and any intermediate flush commands, and only executes the last flush command.

For example, after determining that pending commands buffer 124 includes three additional flush commands C1e, C4b and C3e, command processor 118 bypasses execution of first flush command C2c. Command processor 118 selects and executes write command C1d, and then selects and executes read command C3b. Command processor 118 then selects intermediate flush command C1e, but bypasses execution of intermediate flush command C1e.

Command processor 118 selects and executes write command C4a, and then selects and executes write command C3c. Command processor 118 then selects intermediate flush command C4b, but bypasses execution of intermediate flush command C4b. Command processor 118 selects and executes read command C3d. Finally, command processor selects and executes last flush command C3e. Command processor 118 then sends host device 102 committed indications for flush commands C2c, C1e, C4b and C3e.

In another embodiment, command processor 118 consolidates execution of fewer than all of additional flush commands C1e, C4b and C3e. For example, command processor 118 may consolidate execution of flush commands C2c and C1e into execution of a single flush command C1e, and may consolidate execution of flush commands C4b and C3e into execution of a single flush command C3e. In other embodiments, command processor 118 may consolidate execution of flush commands C2c, C1e and C4b into execution of a single flush command C4b, or may consolidate execution of flush commands C1e, C4b and C3e into execution of a single flush command C3e.

Figure 4:
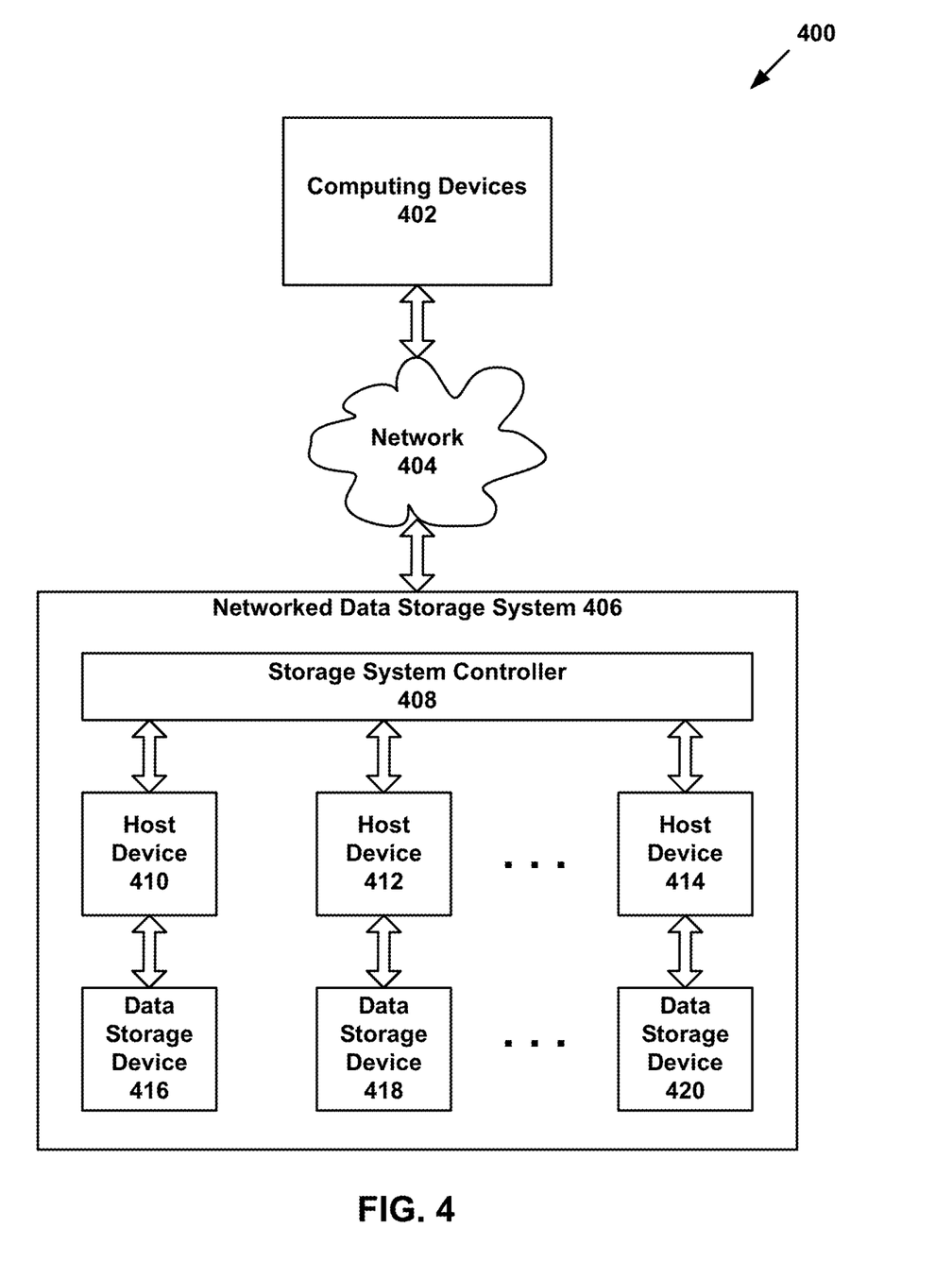
FIG. 4 is a block diagram of an embodiment of a system including multiple data storage devices of a networked data storage system.

FIG. 4 is a block diagram of an embodiment of a system 400 including multiple data storage devices of a networked data storage system. In an embodiment, at least one of the data storage devices is configured to reduce a number of flush commands executed by the data storage device.

System 400 includes one or more computing devices 402 coupled to a network 404. The computing devices 402 may include client devices (e.g., a mobile computer device or a desktop computing device associated with a user), may include one or more servers (e.g., a content distribution network server, a server at a data center, or a server at an enterprise data system), or may include both clients and servers.

The one or more computing devices 402 may communicate via network 404 with a networked data storage system 406. Networked data storage system 406 may include a cloud storage system, an enterprise data system, a network attached storage system, or another data storage system configured to store data received from the one or more computing devices 402, configured to provide stored data to the one or more computing devices 402, or a combination thereof.

Networked data storage system 406 may include a storage system controller 408, host devices 410, 412, 414, and data storage devices 416, 418, 420. Each data storage device 416, 418, 420 may be associated with a host device (e.g., host devices 410, 412, 414, respectively). Each of host devices 410, 412, 414 may operate as described above with reference to host device 102 of FIG. 1.

Storage system controller 408 may facilitate routing of data between the one or more computing devices 402 and particular data storage device(s) 416, 418, 420. Storage system controller 408 also may provide other functions, such as load balancing, striping of data across multiple data storage devices, data communication, data computation, etc.

One or more of data storage devices 416, 418, 420 may correspond to data storage device 104 of FIG. 1. For example, one or more of data storage devices 416, 418, 420 may include controller 106, command processor 118, and pending commands buffer 124 of FIG. 1. In an embodiment, each of data storage devices 416, 418 420 include a corresponding controller 106 configured to reduce a number of flush commands executed by data storage devices 416, 418, 420, such as described above in connection with data storage device 104 of FIG. 1.

In another embodiment, storage system controller 408 provides the functions of host device 102 of FIG. 1. For example, submission queues submission queues $SQ_1$, $SQ_2$, . . . , $SQ_N$, completion queues submission queues $CQ_1$, $CQ_2$, . . . , $CQ_N$, or both, may reside at storage system controller 408. In this embodiment, one or more of accessing devices 410, 412, 414 may be omitted.

In yet another embodiment, computing devices 402 function as host devices. For example, $SQ_1$, $SQ_2$, . . . , $SQ_N$, completion queues submission queues $CQ_1$, $CQ_2$, . . . , $CQ_N$, or both, may reside at computing devices 402. In this embodiment, one or more of host devices 410, 412, 414 may be omitted. Although FIG. 4 illustrates three data storage devices 416, 418, 420 and a corresponding set of three accessing devices 410, 412, 414, networked data storage system 406 may include more than or fewer than three data storage devices and/or more than or fewer than three accessing devices.

Thus, system 400 is configured to reduce a number of flush commands executed by at least one of data storage devices 416, 418, 420.

Figure 5:
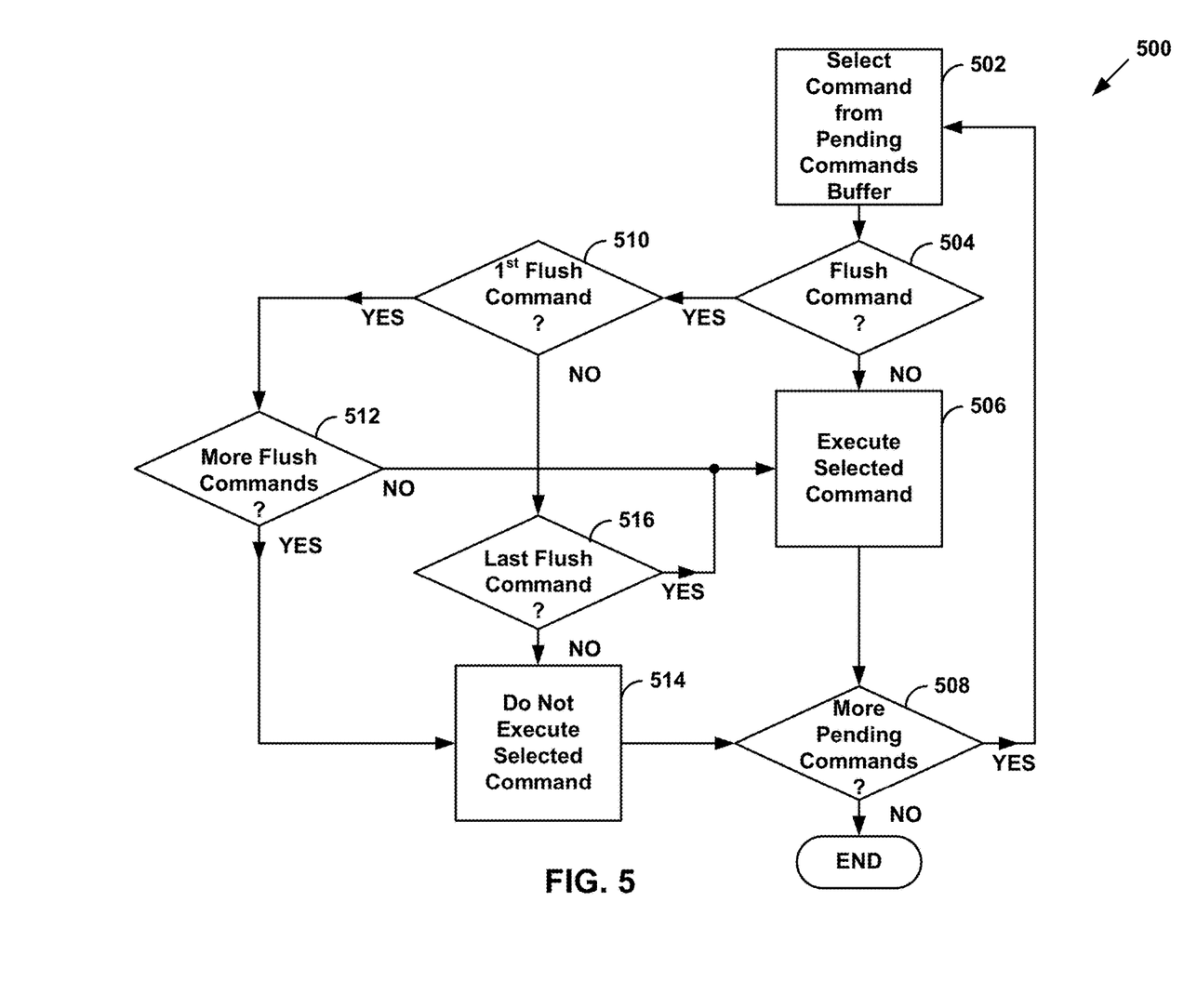
FIG. 5 is a flow diagram of an embodiment of a method implemented by a data storage device.

FIG. 5 is a flowchart of an embodiment of a method 500 for reducing a number of flush commands executed by a data storage device. Method 500 may be performed at a data storage device, such as data storage device 104 of FIG. 1, or one or more of data storage devices 416, 418, 420 of FIG. 4. In an embodiment, method 500 may be performed by controller 106 of data storage device 104 of FIG. 1, or by a controller of one or more of data storage devices 416, 418, 420 of FIG. 4. In an embodiment, method 500 may be performed by command processor 118 data storage device 104 of FIG. 1, or by a command processor of one or more of data storage devices 416, 418, 420 of FIG. 4. For simplicity, method 500 will be described with respect to data storage device 104 of FIG. 1.

At step 502, a pending command is selected from pending commands buffer 124. In an embodiment, command processor 118 selects pending commands in a sequential order from pending commands buffer 124. In other embodiments, command processor 118 may select pending commands in a non-sequential order from pending commands buffer 124. For example, command processor 118 may select pending commands from pending commands buffer 124 based on a priority associated with each pending command.

At step 504, a determination is made whether the selected pending command is a flush command. In an embodiment, command processor 118 determines if the selected pending command is a flush command or other type of command.

If at step 504, the determination is made that the selected pending command is not a flush command, at step 506 the selected command is executed. In an embodiment, command processor 118 executes the selected command and sends a completed indication for the executed command to host device 102.

At step 508, a determination is made whether pending commands buffer 124 includes more pending commands. In an embodiment, command processor 118 scans pending commands buffer 124 to determine if pending commands buffer 124 includes more pending commands. If there are no more pending commands in pending commands buffer 124, the process ends. If, however, pending commands buffer 124 includes more pending commands, the process returns to step 502, and another pending command is selected from pending commands buffer 124.

If at step 504 the determination is made that the selected pending command is a flush command, at step 510 a determination is made whether the selected pending command is a first flush command selected from pending commands buffer 124. In an embodiment, command processor 118 may set a flag to a first value (e.g., 0) when commencing method 500, and may set the flag to a second value (e.g., 1) after command processor 118 selects a first flush command from pending commands buffer 124. In this regard, when command processor 118 selects a flush command from pending commands buffer 124, command processor 118 can check the value of the flag to determine if the selected flush command is a first flush command selected from pending commands buffer 124.

If the selected pending command is a first flush command, at step 512 a determination is made whether pending commands buffer 124 includes additional flush commands. In an embodiment, command processor 118 scans pending commands buffer 124 to determine if pending commands buffer 124 includes additional flush commands.

If at step 512 a determination is made that pending commands buffer 124 does not include additional flush commands, the first flush command is the only flush command in pending commands buffer 124. Accordingly, the process proceeds to step 506, and the flush command is executed. In an embodiment, command processor 118 executes the flush command and sends host device 102 a committed indication to indicate that the pending flush command is completed.

If at step 512 a determination is made pending commands buffer 124 includes additional flush commands, the process proceeds to step 514, and the first flush command is not executed. In an embodiment, command processor 118 bypasses the first flush command, and the process proceeds to step 508 to determine if pending commands buffer 124 includes additional pending commands.

If at step 510 a determination is made that the selected flush command is not the first flush command in pending commands buffer 124, at step 516 a determination is made whether the selected flush command is the last flush command in pending commands buffer 124.

If the selected flush command is not the last flush command in pending commands buffer 124, the process proceeds to step 514, and the intermediate flush command is not executed. In an embodiment, command processor 118 bypasses the intermediate flush command, and the process proceeds to step 508 to determine if pending commands buffer 124 includes additional pending commands.

If the selected flush command is the last flush command in pending commands buffer 124, the process proceeds to step 506, and the last flush command is executed. In an embodiment, command processor 118 executes the last flush command, and then sends host device 102 committed indications for all of the flush commands that had been included in pending commands buffer 124.

Without wanting to be bound by any particular theory, it is believed that method 500 may reduce a number of flush commands executed by a data storage device, such as data storage device 104 of FIG. 1, or one or more of data storage devices 416, 418, 420 of FIG. 4.

As described above, in an embodiment, command processor 118 obtains (e.g., receives or retrieves) pending commands from submission queues $SQ_1$, $SQ_2$, . . . , $SQ_N$ of host device 102, stores the received/retrieved pending commands in pending commands buffer 124, scans pending commands buffer 124 to identify multiple flush commands, and bypasses first and any intermediate flush commands to reduce a number of flush commands executed by data storage device. In an alternative embodiment, a hardware accelerator may be used to merge multiple flush commands in submission queues $SQ_1, SQ_2, \ldots, SQ_N$, so that command processor 118 obtains (e.g., receives or retrieves) only the single merged flush command from submission queues $SQ_1, SQ_2, \ldots, SQ_N$ of host device 102.

Figure 6:
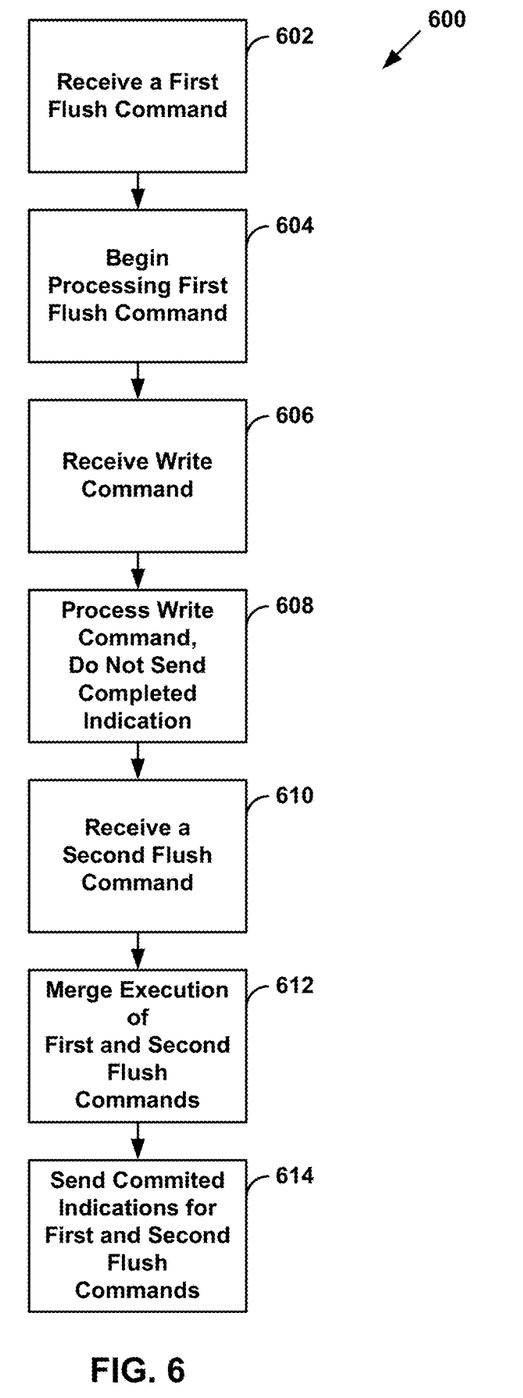
FIG. 6 is a flow diagram of an embodiment of another method implemented by a data storage device.

FIG. 6 is a flowchart of an embodiment of a method 600 for merging flush commands executed by a data storage device. Method 600 may be performed at a data storage device, such as data storage device 104 of FIG. 1, or one or more of data storage devices 416, 418, 420 of FIG. 4. In an embodiment, method 500 may be performed by controller 106 of data storage device 104 of FIG. 1, or by a controller of one or more of data storage devices 416, 418, 420 of FIG. 4. In an embodiment, method 500 may be performed by command processor 118 data storage device 104 of FIG. 1, or by a command processor of one or more of data storage devices 416, 418, 420 of FIG. 4. For simplicity, method 600 will be described with respect to data storage device 104 of FIG. 1.

At step 602, a data storage device receives a first flush command. In an embodiment, command processor 118 receives or retrieves a first flush command from host device 102. The second flush command instructs command processor 118 to write all data stored in write cache 122 (referred to herein as "first data") to non-volatile memory 108.

At step 604, the data storage device begins processing the first flush command. In an embodiment, command processor 118 begins processing the first flush command and commences writing first data to non-volatile memory 108.

At step 606, prior to completing execution of the first flush command, the data storage device receives or retrieves one or more write commands from host device 102. In an embodiment, prior to completing writing first data to non-volatile memory 108, command processor 118 receives or retrieves one or more write commands from host device 102.

At step 608, the data storage device processes the one or more write commands received at step 606, but withholds sending host device 102 completed indications for the one or more write commands. In an embodiment, command processor 118 saves pending data 116 associated with the one or more write commands (referred to herein as "second data") to write cache 122. Command processor 118 does not send host device 102 completed indications for the one or more write commands.

At step 610, the data storage device receives or retrieves a second flush command from host device 102. In an embodiment, command processor 118 receives or retrieves the second flush command from host device 102. The second flush command instructs command processor 118 to write second data to non-volatile memory 108.

At step 612, the data storage device merges execution of the first flush command and the second flush command. In an embodiment, command processor 118 completes writing first data to non-volatile memory 108, but does not immediately send a committed indication with respect to the first flush command to host device 102. Instead, command processor 118 writes second data to non-volatile memory 108. After completing writing second data to non-volatile memory 108, command processor 118 sends committed indications with respect to the first flush command and the second flush command to host device 102.

Without wanting to be bound by any particular theory, it is believed that method 600 may reduce a number of flush commands executed by a data storage device, such as data storage device 104 of FIG. 1, or one or more of data storage devices 416, 418, 420 of FIG. 4.

Although various components depicted herein are illustrated as block components and described in general terms, such components may include one or more microprocessors, state machines, or other circuits configured to enable a data storage device, such as data storage device 104 of FIG. 1, or one or more of data storage devices 416, 418, 420 of FIG. 4, to perform the particular functions attributed to such components, or any combination thereof. Components described herein may be operationally coupled to one another using one or more nodes, one or more buses (e.g., data buses and/or control buses), one or more other structures, or a combination thereof. One or more components described herein (e.g., controller 106 of FIG. 1) may represent physical components, such as hardware controllers, state machines, logic circuits, or other structures.

Controller 106 and/or command processor 118 may be implemented using a microprocessor or microcontroller programmed to reduce a number of flush commands executed by a data storage device (e.g., using one or more operations of method 400 of FIG. 4). In an embodiment, controller 106 and command processor 118 include a processor executing instructions that are stored at non-volatile memory 108. Alternatively, or in addition, executable instructions that are executed by the processor may be stored at a separate memory location that is not part of non-volatile memory 108, such as at a read-only memory (ROM) (not shown).

To further illustrate, a controller (e.g., controller 106) may include a processor that is configured to execute instructions to perform certain operations described herein. The processor may include an execution unit operable to execute the instructions. The processor may execute instructions to receive commands or to process received commands from a host device (e.g., to receive flush commands).

For example, the processor may execute one or more instructions related to a communication protocol, such as instructions to implement a NVMe specification, a PCI Express specification, a JEDEC industry specification, such as an eMMC specification, a Universal Flash Storage (UFS) specification, a USB specification, a SD specification, or a network communication protocol (e.g., FTP).

Data storage device 104 and/or one or more of data storage devices 416, 418, 420 may be attached to or embedded within one or more host devices, such as within a housing of a portable communication device. For example, data storage device 104 and/or one or more of data storage devices 416, 418, 420 may be within a packaged apparatus, such as a wireless telephone, a personal digital assistant (PDA), gaming device or console, a portable navigation device, or other device that uses internal non-volatile memory.

In other embodiments, data storage device 104 and/or one or more of data storage devices 416, 418, 420 may be a portable device configured to be selectively coupled to one or more external devices. In still other embodiments, data storage device 104 and/or one or more of data storage devices 416, 418, 420 may be components (e.g., solid-state drives (SSDs) of a network accessible data storage system, such as an enterprise data system, a network-attached storage system, a cloud data storage system, etc.

To further illustrate, a data storage device (e.g., data storage device 104 and/or one or more of data storage devices 416, 418, 420) may be configured to be coupled to a host device (e.g., host device 102 or one or more of host devices 410, 412, 414) as embedded memory, such as in connection with an embedded MultiMedia Card (eMMC®) (trademark of JEDEC Solid State Technology Association, Arlington, Va.) configuration, as an illustrative example.

The data storage device may correspond to an eMMC device. As another example, the data storage device may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device may operate in compliance with an industry specification. For example, the data storage device may operate in compliance with a NVMe specification, a JEDEC eMMC specification, a JEDEC Universal Flash Storage (UFS) specification, one or more other specifications, or a combination thereof.

Alternatively, the data storage device may be a component of networked data storage system, and may communicate via a network using a network protocol, such as a Network File System (NFS) protocol, a Common Internet File System (CIFS) protocol, a Hypertext Transfer Protocol (HTTP), a Hypertext Transfer Protocol Secure (HTTPS), a File Transfer Protocol (FTP), a Secure File Transfer Protocol (SFTP), a Point to Point Protocol (PPP), an Internet Protocol (IP), a Transmission Control Protocol (TCP), another communication protocol, or a combination thereof.

In particular embodiments, a memory (e.g., non-volatile memory 108) includes a three-dimensional (3D) memory, such as a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), or a combination thereof. Alternatively or in addition, the memory may include another type of memory. The memory may include a semiconductor memory device.

Semiconductor memory devices include volatile memory devices (e.g., write cache 122 of FIG. 1), such as dynamic random access memory ("DRAM") or static random access memory ("SRAM") devices, non-volatile memory devices (e.g., non-volatile memory 108 of FIG. 1), such as resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arranged in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels.

As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used to facilitate operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description One embodiment includes a data storage device that includes a write cache, a non-volatile memory and a controller coupled to the write cache and to the non-volatile memory. The controller is configured to, responsive to receiving a plurality of flush commands, write all data from the write cache to the non-volatile memory while executing fewer than all of the plurality of flush commands.

One embodiment includes a method including, at a data storage device including a write cache, a non-volatile memory and a controller comprising, performing receiving a plurality of flush commands, and writing all data from the write cache to the non-volatile memory while executing fewer than all of the plurality of flush commands.

One embodiment includes method including, at a data storage device comprising a write cache, a non-volatile memory and a controller comprising, performing receiving a write command associated with first pending data, executing the first write command, sending a host device a completion indication associated with the first write command, receiving a first flush command, commencing execution of the first flush command, receiving a second write command prior to completing execution of the first flush command, executing the second write command, and withholding sending the host device a completion indication associated with the second write command.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. A data storage device comprising:
   a write cache;
   a non-volatile memory; and
   a controller coupled to the write cache and to the non-volatile memory, the controller configured to, responsive to receiving a plurality of flush commands from a host device, write all data from the write cache to the non-volatile memory while executing a subset of the plurality of flush commands and bypassing execution of one or more of the plurality of flush commands,
   wherein executing a flush command writes all of the data from the write cache to the non-volatile memory, and
   wherein after completing writing all of the data from the write cache to the non-volatile memory, the controller is configured to send the host device separate committed indications for each of the plurality of flush commands to indicate to the host device that all data from the write cache have been written to non-volatile memory.

2. The data storage device of claim 1, wherein the controller is configured to bypass execution of all but one of the plurality of flush commands.

3. The data storage device of claim 1, wherein the data corresponds to one or more write commands that are identified in a submission queue of the host device and that are identified in a completion queue of the host device.

4. The data storage device of claim 1, wherein the controller comprises a command processor and a pending commands buffer comprising the plurality of flush commands and a plurality of write commands associated with the data, wherein the command processor is configured to selectively execute write commands and the plurality of flush commands in the pending commands buffer.

5. The data storage device of claim 4, wherein the command processor is configured to, responsive to determining that the pending commands buffer includes a plurality of flush commands, execute fewer than all of the plurality of flush commands in the pending commands buffer.

6. The data storage device of claim 1, wherein:
the plurality of flush commands comprises a first flush command and a second flush command; and
the controller is configured to merge execution of the first flush command and the second flush command.

7. A method comprising:
at a data storage device comprising a write cache, a non-volatile memory and a controller comprising, performing:
receiving a plurality of flush commands from a host device;
writing all data from the write cache to the non-volatile memory while executing a subset of the plurality of flush commands and bypassing execution of one or more of the plurality of flush commands, wherein executing a flush command writes all of the data from the write cache to the non-volatile memory; and
sending the host device separate committed indications for each of the plurality of flush commands to indicate to the host device that all data from the write cache have been written to non-volatile memory.

8. The method of claim 7, wherein the method further comprises bypassing execution of all but one of the plurality of flush commands.

9. The method of claim 7, wherein the data corresponds to one or more write commands that are identified in a submission queue of the host device and that are identified in a completion queue of the host device.

10. The method of claim 7, wherein the controller comprises a pending commands buffer comprising the plurality of flush commands and a plurality of write commands associated with the data, wherein the method further comprises selectively executing the write commands and the plurality of flush commands in the pending commands buffer.

11. The method of claim 10, further comprising:
determining that the pending commands buffer includes a plurality of flush commands and;
determining which of the fewer than all of the plurality of flush commands in the pending commands buffer to execute.

12. The method of claim 7, wherein:
the plurality of flush commands comprises a first flush command and a second flush command; and
the method further comprises merging execution of the first flush command and the second flush command.

* * * * *